United States Patent
Whittle et al.

(10) Patent No.: US 11,066,942 B2
(45) Date of Patent: Jul. 20, 2021

(54) SYSTEMS AND METHOD FOR DETERMINING TURBINE ASSEMBLY FLOW CHARACTERISTICS

(71) Applicant: Rolls-Royce plc, London (GB)

(72) Inventors: Michael J. Whittle, London (GB); Roderick M. Townes, London (GB); Andrew Holt, London (GB)

(73) Assignee: Rolls-Royce plc

( * ) Notice: Subject to any disclaimer, the term of this patent is extended or adjusted under 35 U.S.C. 154(b) by 28 days.

(21) Appl. No.: 16/410,632

(22) Filed: May 13, 2019

(65) Prior Publication Data

US 2020/0362710 A1 Nov. 19, 2020

(51) Int. Cl.
*B23P 15/04* (2006.01)
*F01D 9/04* (2006.01)

(52) U.S. Cl.
CPC .............. *F01D 9/041* (2013.01); *B23P 15/04* (2013.01); *F01D 9/047* (2013.01); *F05D 2230/14* (2013.01); *F05D 2230/60* (2013.01); *F05D 2230/90* (2013.01); *F05D 2300/6033* (2013.01)

(58) Field of Classification Search
CPC .. B23P 15/02; B23P 15/04; F01D 5/30; F05D 2230/14; F05D 2230/18; F05D 2230/60; F05D 2230/90
See application file for complete search history.

(56) References Cited

U.S. PATENT DOCUMENTS

| | | | |
|---|---|---|---|
| 6,604,285 B2 | 8/2003 | Burdgick | |
| 6,789,315 B2 | 9/2004 | Marques et al. | |
| 7,186,070 B2 | 3/2007 | Morris et al. | |
| 8,020,269 B2 | 9/2011 | Beverley et al. | |
| 10,012,976 B2 | 7/2018 | Louesdon et al. | |
| 2013/0004320 A1 | 1/2013 | Perret et al. | |
| 2014/0142889 A1 | 5/2014 | Chuong | |
| 2016/0146601 A1 | 5/2016 | Chuong | |
| 2017/0206303 A1 | 7/2017 | Burkett | |
| 2018/0052444 A1 | 2/2018 | Korsedal et al. | |
| 2018/0099362 A1* | 4/2018 | Hudson | F01D 5/141 |
| 2018/0120079 A1 | 5/2018 | Bather et al. | |
| 2018/0223680 A1 | 8/2018 | Hafner | |
| 2019/0039083 A1* | 2/2019 | Bourne | B05B 12/004 |

* cited by examiner

*Primary Examiner* — Christopher J Besler
(74) *Attorney, Agent, or Firm* — Barnes & Thornburg LLP

(57) ABSTRACT

A gas turbine engine includes a compressor, a combustor, and a turbine arranged around an axis. The turbine includes a turbine vane assembly. A method for creating the turbine vane assembly includes fabricating a plurality of turbine vanes comprising ceramic matrix composite material and selecting and arranging the turbine vanes to form a turbine vane assembly.

2 Claims, 11 Drawing Sheets

SYSTEMS AND METHOD FOR DETERMINING TURBINE ASSEMBLY FLOW CHARACTERISTICS

FIELD OF THE DISCLOSURE

The present disclosure relates generally to gas turbine engines, and more specifically to vanes used in gas turbine engines that include ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The integration of ceramic matrix composite materials into static vane assemblies is of interest because of the high-temperature capability of these materials. However, producing vane assemblies within acceptable tolerances presents challenges based on the numerous opportunities to introduce variation in size and shape during the fabrication process of vanes containing ceramic matrix composite materials.

SUMMARY

The present disclosure may comprise one or more of the following features and combinations thereof.

A method of providing a turbine vane assembly may include fabricating a plurality of turbine vanes comprising ceramic matrix composite material, determining a size of each of the plurality of turbine vanes, selecting a predetermined number of turbine vanes from the plurality of turbine vanes based on the size of each of the plurality of turbine vanes, and arranging the predetermined number of turbine vanes around an axis to provide a turbine vane assembly having a throat area within a predetermined tolerance of a desired throat area.

In some embodiments, the selecting step may include identifying a first number of turbine vanes from the plurality of turbine vanes and a second number of turbine vanes from the plurality of turbine vanes. The selecting step may include determining a first throat area of a first turbine vane assembly comprised of the first number of turbine vanes in a set arrangement. The selecting step may include determining a second throat area of a second turbine vane assembly comprised of the second number of turbine vanes in a set arrangement. The selecting step may include selecting one of the first number of turbine vanes and the second number of turbine vanes to be the predetermined number of turbine vanes based on which of the first throat area and the second throat area is within the predetermined tolerance of the desired throat area. The second number of turbine vanes may include at least one turbine vane included in the first number of turbine vanes.

In some embodiments, the selecting step may include identifying a first number of turbine vanes from the plurality of turbine vanes and a second number of turbine vanes from the plurality of turbine vanes. The selecting step may include determining a first throat area of a first turbine vane assembly comprised of the first number of turbine vanes in a set arrangement. The selecting step may include determining a second throat area of a second turbine vane assembly comprised of the second number of turbine vanes in a set arrangement. The selecting step may include selecting one of the first number of turbine vanes and the second number of turbine vanes to be the predetermined number of turbine vanes based on which of the first throat area and the second throat area is closest to the desired throat area.

In some embodiments, the selecting step may include identifying the predetermined number of turbine vanes from the plurality of turbine vanes. The selecting step may include determining a first throat area of a first turbine vane assembly comprised of the predetermined number of turbine vanes in a first set arrangement. The selecting step may include determining a second throat area of a second turbine vane assembly comprised of the predermined number of turbine vanes in a second set arrangement.

In some embodiments, the arranging step may include arranging the predetermined number of turbine vanes in one of the first set arrangement and the second set arrangement based on which of the first set arrangement and the second set arrangement is within the predetermined tolerance of the desired throat area. In some embodiments, the arranging step may include arranging the predetermined number of turbine vanes in one of the first set arrangement and the second set arrangement based on which of the first set arrangement and the second set arrangement provides the throat area closest to the desired throat area.

In some embodiments, the selecting step may include identifying a first turbine vane, a second turbine vane, and a third turbine vane from the plurality of turbine vanes. The selecting step may include determining a first vane-pair throat area defined between the first turbine vane and the second turbine vane. The selecting step may include determining a second vane-pair throat area defined between the first turbine vane and the third turbine vane. The selecting step may include and selecting the first turbine vane and one of the second turbine vane and the third turbine vane to be included in the predetermined number of turbine vanes based on which of the first vane-pair throat area and the second vane-pair throat area is closest to a predetermined vane-pair throat area.

In some embodiments, the selecting step may include identifying a first turbine vane and a second turbine vane from the plurality of turbine vanes. The selecting step may include determining a first vane-pair throat area defined between the first turbine vane and a nominal turbine vane. The selecting step may include determining a second vane-pair throat area defined between the second turbine vane and the nominal turbine vane. The selecting step may include selecting one of the first turbine vane and the second turbine vane to be included in the predetermined number of turbine vanes based on which of the first vane-pair throat area and the second vane-pair throat area is closest to a predetermined vane-pair throat area.

In some embodiments, the selecting step may include identifying a first turbine vane, a second turbine vane, a third turbine vane, and a fourth turbine vane from the plurality of turbine vanes. The selecting step may include determining a first vane-pair throat area defined between the first turbine vane and the second turbine vane. The selecting step may include determining a second vane-pair throat area defined between the second turbine vane and the third turbine vane.

The selecting step may include determining a third vane-pair throat area defined between the second turbine vane and the fourth turbine vane.

In some embodiments, the selecting step may include summing the first vane-pair throat area and the second vane-pair throat area to provide a first summed throat area. The selecting step may include summing the first vane-pair throat area and the third vane-pair throat area to provide a second summed throat area. The selecting step may include selecting the first turbine vane, the second turbine vane, and one of the third turbine vane and the fourth turbine vane to be included in the predetermined number of turbine vanes based on which of the first summed throat area and the second summed throat area is closest to a predetermined summed throat area.

In some embodiments, the selecting step may include determining a set arrangement order of the predetermined number of turbine vanes that achieves the turbine vane assembly having the throat area within the predetermined tolerance of the desired throat area. The arranging step may include locating the predetermined number of turbine vanes in the set arrangement order.

In some embodiments, the fabricating step may include forming a plurality of non-machined turbine vanes The fabricating step may include determining a size of each of the plurality of non-machined turbine vanes. The fabricating step may include machining the plurality of non-machined turbine vanes to remove an amount of material based on the size of each of the plurality of non-machined turbine vanes from a trailing edge of each of the plurality of turbine vanes. The fabricating step may include forming a plurality of non-coated turbine vanes, determining a size of each of the plurality of non-coated turbine vanes. The fabricating step may include coating each of the plurality of non-coated turbine vanes with a coating having a thickness based on the size of each of the plurality of non-coated turbine vanes.

According to another aspect of the present disclosure, a method may include providing a first tool sized to form turbine vanes having a first nominal size and a second tool sized to form turbine vanes having a second nominal size. The second nominal size may be different than the first nominal size. The method may include fabricating a first plurality of turbine vanes and a second plurality of turbine vanes. The fabricating step may include forming a first plurality of non-machined turbine vanes comprising ceramic matrix composite material from the first tool and forming a second plurality of non-machined turbine vanes comprising ceramic matrix composite material from the second tool. The method may include determining a size of each of the first plurality of turbine vanes and a size of each of the second plurality of turbine vanes. The method may include selecting a predetermined number of turbine vanes from the first plurality of turbine vanes and the second plurality of turbine vanes. The method may include arranging the predetermined number of turbine vanes around an axis to provide a turbine vane assembly having a throat area with a desired size.

In some embodiments, the first plurality of turbine vanes may be configured to flow a first nominal amount of gas between adjacent turbine vanes. The second plurality of turbine vanes may be configured to flow a second nominal amount of gas between adjacent turbine vanes. The second nominal amount of gas may be different than the first nominal amount of gas.

In some embodiments, the fabricating step may include machining a trailing edge of each of the first plurality of turbine vanes based on a pre-machined size of each of the first plurality of turbine vanes. The fabricating step may include machining a trailing edge of each of the second plurality of turbine vanes based on a pre-machined size of each of the second plurality of turbine vanes.

In some embodiments, the fabricating step may include coating the first plurality of turbine vanes with an individually selected thickness of coating for each of the first plurality of turbine vanes based on a non-coated size of each of the first plurality of turbine vanes. The fabricating step may include coating the second plurality of turbine vanes with an individually selected thickness of coating for each of the second plurality of turbine vanes based on a non-coated size of each of the second plurality of turbine vanes.

According to another aspect of the present disclosure, a method of providing a turbine vane assembly may include determining a desired number of turbine vanes configured to be arranged circumferentially adjacent to one another about an axis to form a vane assembly that extends around the axis. The method may include fabricating an inventory of turbine vanes. The inventory of turbine vanes may have a greater number of turbine vanes than the desired number of turbine vanes. The method may include determining a nominal throat area of a nominal turbine vane and determining a fabricating deviation value for each turbine vane included in the inventory of turbine vanes. The fabricating deviation value is the difference between the throat area of a turbine vane included in the inventory of vanes and the nominal throat area of a nominal vane. The method may include selecting one turbine vane from the inventory of turbine vanes. The selected one turbine vane has a fabricating deviation value smaller than each unselected turbine vane included in the inventory of turbine vanes. The method may include repeating the step of: selecting one turbine vane from the inventory of turbine vanes until the desired number of turbine vanes has been selected from the inventory of turbine vanes. The method may include arranging each selected turbine vane circumferentially adjacent to another selected turbine vane to form the vane assembly that extends around the axis.

In some embodiments, the method may include calculating an actual throat area of each selected and arranged turbine vane. The method may include calculating an arrangement deviation value for each selected and arranged turbine vane. The arrangement deviation value is the difference between the actual throat area of a selected and arranged turbine vane and the nominal throat area of a nominal vane.

In some embodiments, the method may include calculating a total arrangement deviation value of the vane assembly by summing the arrangement deviation value of each selected and arranged turbine vane. the method may include rearranging at least one selected and arranged turbine vane relative to another selected and arrange turbine vane to reduce the total arrangement deviation value of the vane assembly.

In some embodiments, the method may include calculating a total arrangement deviation value of the vane assembly by summing the arrangement deviation value of each selected and arranged turbine vane. The method may include rotating at least a portion of one selected and arranged turbine vane relative to another selected and arrange turbine vane to reduce the total arrangement deviation value of the vane assembly.

These and other features of the present disclosure will become more apparent from the following description of the illustrative embodiments.

DETAILED DESCRIPTION OF THE DRAWINGS

Figure 1:
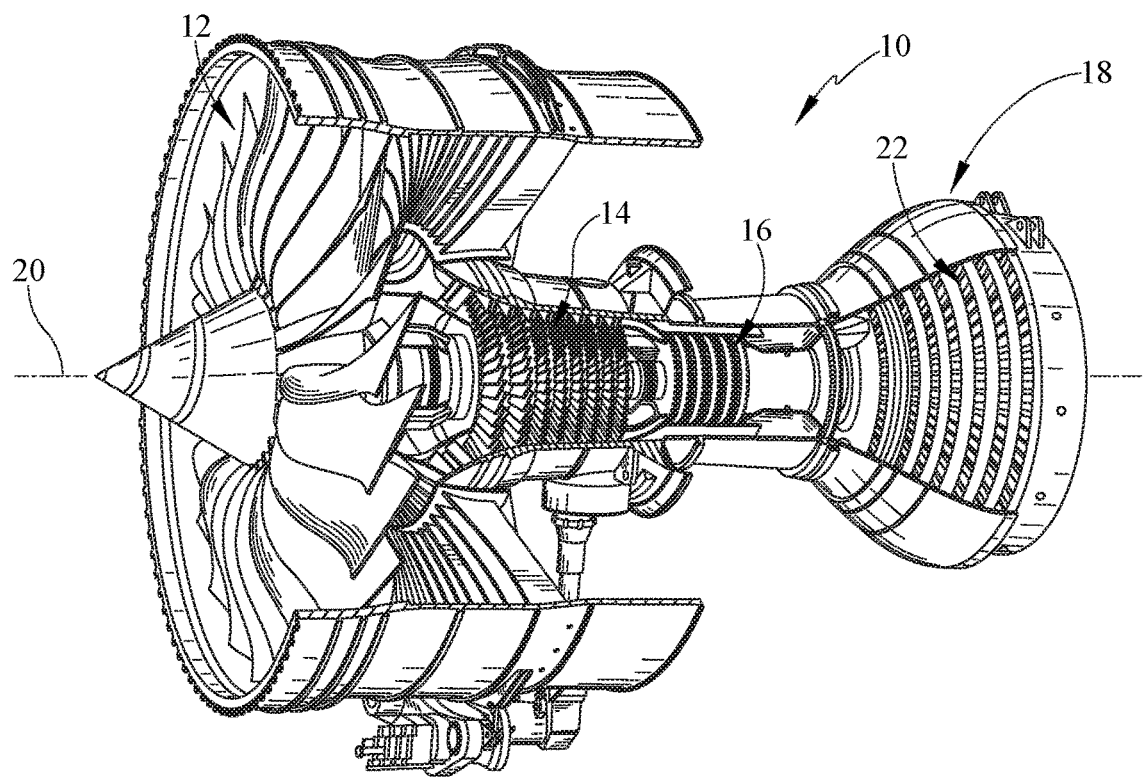
FIG. 1 is a cut-away perspective view of a gas turbine engine that includes fan, a compressor, a combustor, and a turbine.

For the purposes of promoting an understanding of the principles of the disclosure, reference will now be made to a number of illustrative embodiments illustrated in the drawings and specific language will be used to describe the same.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

Figures 2, 3:
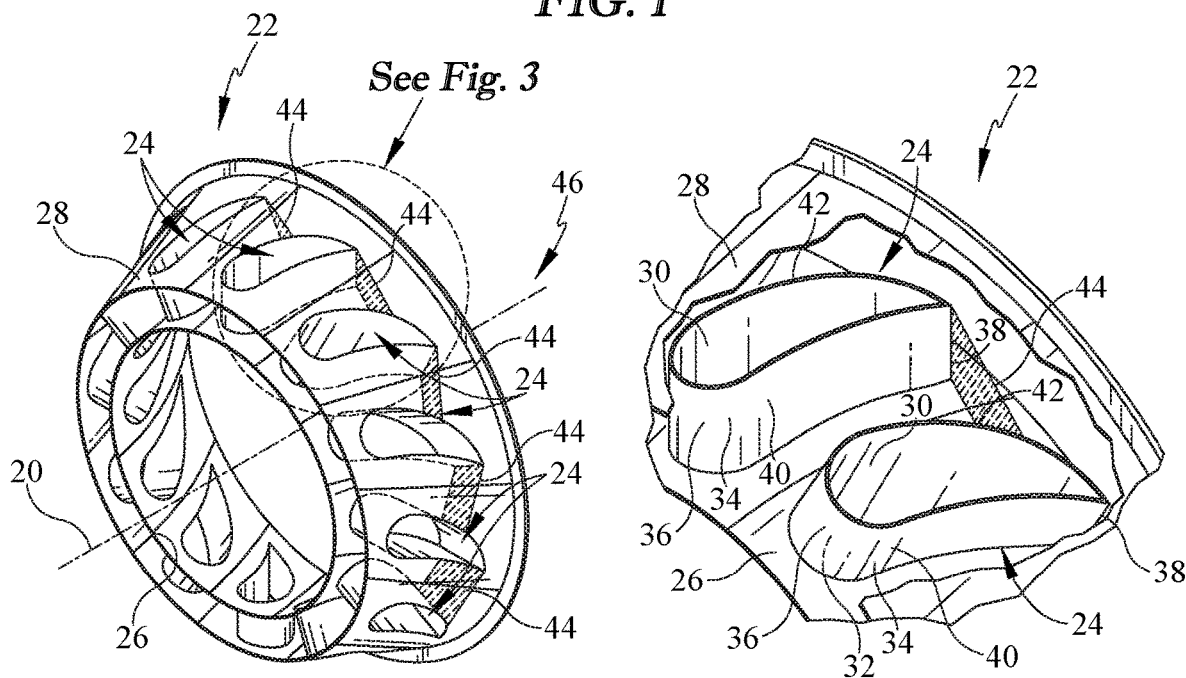
FIG. 2 is a perspective view of the turbine vane assembly included in the turbine of FIG. 1 showing the arrangement of adjacent turbine vanes in the turbine vane assembly and suggesting that the turbine vanes define a throat area of the turbine vane assembly.
FIG. 3 is a perspective view of the dashed section of FIG. 2 with an outer endwall of the turbine vane assembly cut away to show a shaded region known as a throat area defined between adjacent turbine vanes.

A turbine vane assembly 22 is adapted for use in a gas turbine engine 10 as suggested in FIGS. 1-3. The gas turbine engine 10 includes a fan 12, a compressor 14, a combustor 16, and a turbine 18 each arranged around an axis 20. The turbine vane assembly 22 is included in the turbine 18 and includes a plurality of turbine vanes 24 (sometimes called airfoils or aerofoils) arranged around the axis 20. Each turbine vane 24 of the vane assembly 22 is positioned radially between a radially inner endwall 26 and a radially outer endwall 28 relative to the axis 20. Each turbine vane 24 is sized and shaped to interact with hot gases moving axially along a primary gas path of the gas turbine engine 10 relative to the axis 20. The radially inner endwall 26 is shaped to define a boundary of the primary gas path near a radially inner end 30 of the turbine vane 24, and the radially outer endwall 28 is shaped to define a boundary of the primary gas path near a radially outer end 32 of the turbine vane 24.

Illustratively, each turbine vane 24 is formed as a separate segment, and the segments may be arranged adjacent to one another to form the vane assembly 22, as shown in FIG. 2. In some embodiments, the segments may be doublets or triplets such that each segments includes two or three turbine vanes 24. In some embodiments, each turbine vane 24 may be formed separately from the radially inner endwall 26 and the radially outer endwall 28. The radially inner endwall 26 and the radially outer endwall 28 may be arranged as substantially concentric annular hoops, and the turbine vanes 24 may be inserted into the annular hoops to form the vane assembly 22.

The turbine vane 24 includes a sidewall 34 extending between the radially inner end 30 and the radially outer end 32 of the turbine vane 24, as shown in FIG. 3. The sidewall 34 is airfoil shaped and includes a leading edge 36, a trailing edge 38, a pressure side 40, and a suction side 42 as shown in FIG. 3. When the turbine vanes 24 are arranged around the axis 20 to provide the turbine vane assembly 22, each turbine vane 24 has a throat area 44. The throat area 44 is the surface area of an imaginary planar surface extending radially between the radially inner endwall 26 and the radially outer endwall 28 and extending circumferentially the minimum distance between the trailing edge 38 of the turbine vane 24 and the suction side 42 of an adjacent turbine vane 24.

In some embodiments, the throat area 44 is the total surface area of an imaginary planar surface defined between the trailing edge 38 of a first vane and the suction side 42 of an adjacent vane, and the imaginary planar surface is perpendicular to a segment that (i) is tangent to the suction side 42 of the first vane and (ii) passes through an end of the trailing edge 38 of the first vane. In other words, the first vane includes a segment that is tangent to the suction side 42 of the first vane and passes through the end of trailing edge 38 of the first vane; the imaginary planar surface extends between the first vane and the adjacent vane perpendicular to the segment that is tangent to the suction side 42 of the first vane; and, the surface area of the imaginary planar surface is the throat area 44 of the first vane.

In some embodiments, the throat area 44 is the total surface area of an imaginary planar surface defined between the trailing edge 38 of a first vane and the suction side 42 of an adjacent vane. The imaginary planar surface includes a segment that is the diameter of an imaginary spherical ball that, when rolled along the suction side 42 of an adjacent vane, contacts the trailing edge 38 of the first vane at a first end point of the diameter and contacts the suction side 42 of the adjacent vane at a second end point of the diameter.

A target or desired throat area may be determined for turbine vanes 24 to maximize performance of the gas turbine engine 10. When the turbine vanes 24 are arranged around the axis 20 to provide the turbine vane assembly 22, as shown in FIG. 2, a total throat area 46 of the turbine vane assembly 22 may be determined. The total throat area 46 of the turbine vane assembly 22 is determined by summing the throat area 44 of each turbine vane 24 arranged around the axis 20. Various methods of selecting a predetermined number of turbine vanes 24 from a larger inventory of turbine vanes 24 may be performed to provide a turbine vane assembly 22 within a predetermined tolerance of a desired total throat area. Methods 100 and 102 are described in greater detail below.

Figure 4:
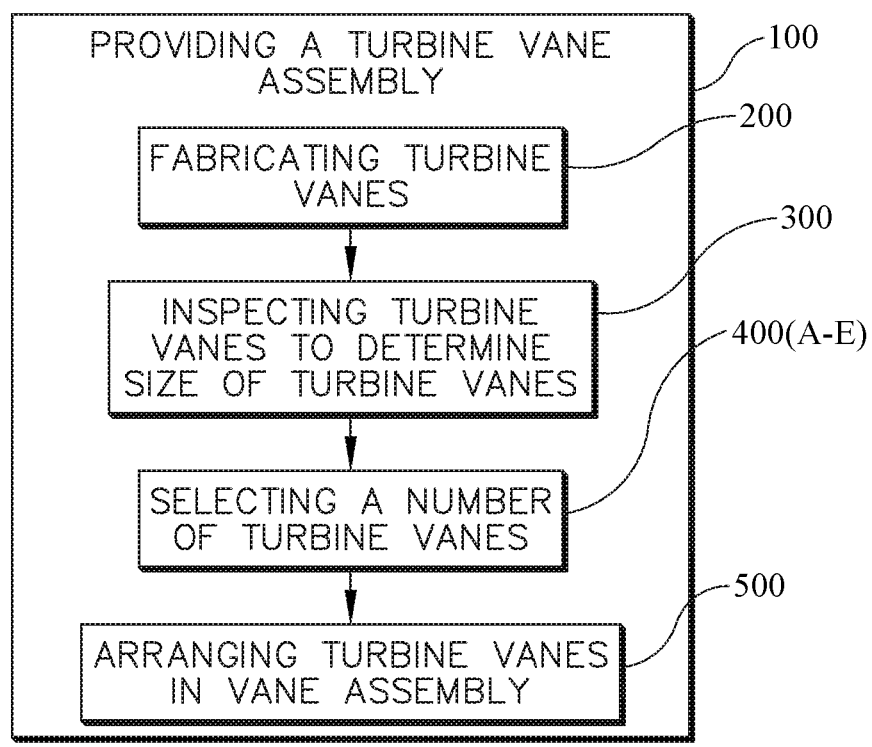
FIG. 4 is a simplified flowchart of a method of providing a turbine vane assembly.
Figure 5:
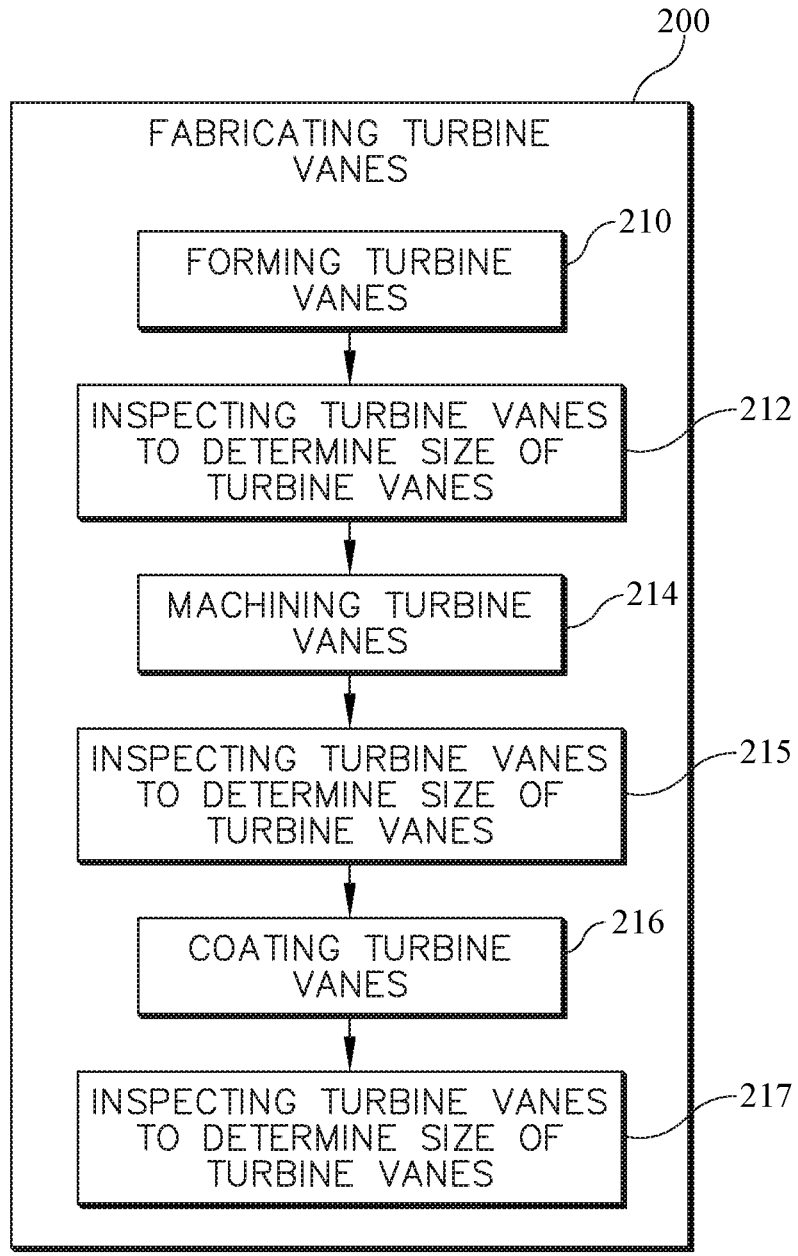
FIG. 5 is a simplified flowchart of a method of fabricating turbine vanes.

In some embodiments, a method 100 of providing a turbine vane assembly may include a fabricating step 200, an inspecting step 300, a selecting step 400(A-E), and an arranging step 500, as shown in FIG. 4. The fabricating step 200 may include a forming step 210, an inspecting step 212, a machining step 214, an inspecting step 215, a coating step 216, and an inspecting step 217, as shown in FIG. 5. The forming step 210 includes forming a plurality of non-machined and/or non-coated turbine vanes 24. The non-machined and/or non-coated turbine vanes may be formed using ceramic matrix composite (CMC) material. The inspecting step 212 includes inspecting turbine vanes to determine a size and shape of each of the plurality of non-machined and/or non-coated turbine vanes.

The inspecting step 215 includes inspecting machined turbine vanes to determine a size and shape of each of the plurality of machined turbine vanes. The inspecting step 217 includes inspecting coated turbine vanes to determine a size and shape of each of the plurality of coated turbine vanes.

In some embodiments, the machining step 214 includes conventional machining, in which a standard amount of material is removed or machined away from a turbine vane 24. In some embodiments, the machining step 214 includes adjusting the size and shape of the turbine vanes 24 to conform the throat area 44 of each machined turbine vane to a desired throat area of the turbine vanes 24. In some embodiments, the machining step 214 includes machining the trailing edge 38 of the turbine vanes 24 based on a pre-machined size and shape of each of the plurality of turbine vanes. In other words, adaptive machining may be used to individually machine each turbine vane 24 from the unique pre-machined size of the turbine vane 24 to a desired size and shape of the turbine vane 24.

Illustratively, the machining techniques described above may be used in conjunction with the selecting step 400(A-E) and/or the arranging step 500, as described in greater detail below. In some embodiments the standard and/or adaptive machining techniques may be used in isolation from the selecting step 400(A-E) and/or the arranging step 500. That is, the standard and/or adaptive machining techniques may be used in conjunction with one another without the use of the selecting step 400(A-E) and/or the arranging step 500. Alternatively, in some embodiments, the standard and/or adaptive machining techniques may be used in isolation from one another and in isolation from the selecting step 400(A-E) and/or the arranging step 500. The standard and/or adaptive machining technique may be used as a means for reducing the variation in the throat area 44 of the turbine vanes 24.

It should be appreciated that the adaptive machining technique may be used in conjunction with the inspection steps 212, 215, and/or 217 in any order and repeated any number of times to achieve a desired throat area 44 of the turbine vane 24 or to reduce the variation in the throat area 44 of the turbine vanes 24. The variation in the throat area 44 of the turbine vanes 24 may be determined via several methods, as described in greater detail below.

In some embodiments, the coating step 216 includes conventional coating, in which a standard amount of environmental barrier coating or other coating is applied to a turbine vane 24. In some embodiments, the coating step 216 includes adjusting a thickness of the environmental barrier coating or other coating to conform the throat area 44 of each coated turbine vane 24 to a desired throat area of the turbine vanes 24. In some embodiments, the coating step 216 includes coating each of the plurality of non-coated turbine vanes with a coating having a thickness based on the size and shape of each of the plurality of non-coated turbine vanes. In other words, individualized coating may be used to individually coat each turbine vane 24 with a unique thickness of the coating to adjust the size and shape of the turbine vane 24 from the unique pre-coated size and shape of the turbine vane 24 to a desired size and shape of the turbine vane 24.

Illustratively, the coating techniques described above may be used in conjunction with the selecting step 400(A-E) and/or the arranging step 500, as described in greater detail below. In some embodiments the conventional and/or individualized coating techniques may be used in isolation from the selecting step 400(A-E) and/or the arranging step 500. That is, the conventional and/or individualized coating techniques may be used in conjunction with one another without the use of the selecting step 400(A-E) and/or the arranging step 500. Alternatively, in some embodiments, the conventional and/or individualized coating techniques may be used in isolation from one another and in isolation from the selecting step 400(A-E) and/or the arranging step 500. The conventional and/or individualized coating technique may be used as a means for reducing the variation in the throat area 44 of the turbine vanes 24.

It should be appreciated that the individualized coating technique may be used in conjunction with the inspection steps 212, 215, and/or 217 in any order and repeated any number of times to achieve a desired throat area 44 of the turbine vane 24 or to reduce the variation in the throat area 44 of the turbine vanes 24. The variation in the throat area 44 of the turbine vanes 24 may be determined via several methods, as described in greater detail below.

It should be appreciated that any of the individualized coating technique, the conventional coating technique, the standard machining technique, and the adaptive machining technique may be used in conjunction with one another and with the inspection steps 212, 215, and or 217 in any order and repeated any number of times to achieve a desired throat area 44 of the turbine vane 24 or to reduce the variation in the throat area 44 of the turbine vanes 24.

In some embodiments, the method 100 of providing a turbine vane assembly may include the step of performing a flow analysis, in which a stream of air or gas flow is passed through the throat areas 44 of turbine vanes 24. The flow may be analyzed to determine whether the turbine vanes 24 are adequately sized and shaped, such that the turbine vanes 24 may be included in the turbine vane assembly 22.

In some embodiments, a possible method for machining may include the steps of: scanning an aerofoil profile; analyzing the profile shape compared to an aerodynamic design intent to find an optimal solution; precision finishing a first throat point datum corresponding to the trailing edge region of the aerofoil profile and a second throat point datum corresponding to a point on the suction side of the aerofoil included in the throat area of an adjacent aerofoil; optionally rescanning the aerofoil to establish a location, position, or orientation of the aerofoil; precision finishing an engine location datum corresponding to the orientation of the aerofoil relative to the engine axis of rotation; performing a predictive analysis of expected flow results of the individual aerofoil relative to a statistical distribution. If the flow is too high, then the analysis would suggest the most desirable datum of the aerofoil to alter. Additionally, the flow may suggest the most desirable aerofoil from an inventory of aerofoils based on which aerofoil includes the desired datum.

In some embodiments, the trailing edge portion may be a cut-back trailing edge in which modular tooling inserts may be provided to form a set or kit of trailing edge inserts having different sizes or shapes. Various trailing edge inserts may be selected to vary the size and shape of the turbine vane.

The inspecting step 300 includes inspecting turbine vanes to identify a size and shape of each fabricated turbine vane. In some embodiments, this includes determining a size and shape of each of a first plurality of turbine vanes and a second plurality of turbine vanes. In other embodiments, this may include inspecting turbine vanes to identify a size and shape of additional pluralities of turbine vanes.

Figure 6:
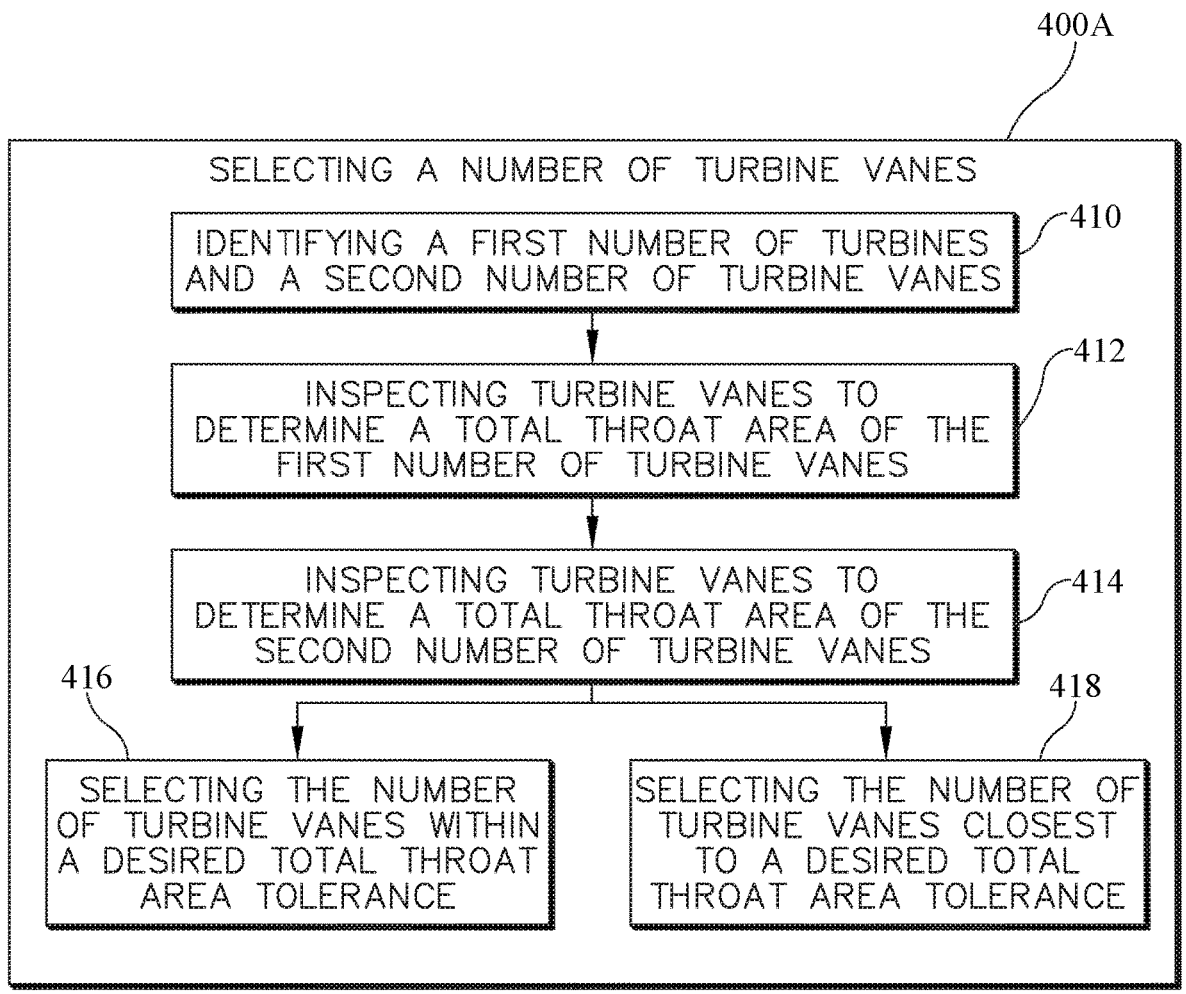
FIG. 6 is a simplified flowchart of a first method of selecting a number of turbine vanes.

With reference to the selecting step 400, in some embodiments, multiple subgroups of turbine vanes 24 are selected from a plurality of turbine vanes 24, and the subgroup of turbine vanes 24 having a tolerance within or closest to a desired total throat area tolerance is selected. As such, the selecting step 400A may include an identifying step 410, a inspecting step 412, an inspecting step 414, and a selecting step 416 or 418, as shown in FIG. 6.

Identifying step 410 includes identifying a first number of turbine vanes from the plurality of turbine vanes and a second number of turbine vanes from the plurality of turbine vanes. Inspecting step 412 includes inspecting turbine vane to determine a first throat area 46 of a first turbine vane assembly comprised of the first number of turbine vanes in a set arrangement. In other words, the first number of turbine vanes identified in identifying step 410 is arranged in a set arrangement, and subsequently, a first total throat area 46 is determined for the first number of turbine vanes arranged in the set arrangement. Inspecting step 414 includes determining a second throat area 46 of a second turbine vane assembly comprised of the second number of turbine vanes in a set arrangement. In other words, the second number of turbine vanes identified in identifying step 410 is arranged in a set arrangement, and subsequently, a second total throat area 46 is determined for the second number of turbine vanes arranged in the set arrangement.

Selecting step 416 includes selecting one of the first number of turbine vanes and the second number of turbine vanes to be the predetermined number of turbine vanes based on which of the first throat area 46 and the second throat area 46 is within the predetermined tolerance of the desired throat area. In other words, if the first number of turbine vanes arranged in a set arrangement has a total throat area 46 within the predetermined tolerance of the desired total throat area, then the first number of turbine vanes is selected. Alternatively, if the second number of turbine vanes arranged in a set arrangement has a total throat area 46 within the predetermined tolerance of the desired total throat area, then the second number of turbine vanes is selected.

In some embodiments, selecting step 418 may be performed instead of selecting step 416. Selecting step 418 includes selecting one of the first number of turbine vanes and the second number of turbine vanes to be the predetermined number of turbine vanes based on which of the first throat area 46 and the second throat area 46 is closest to the desired throat area. In other words, if the first number of turbine vanes arranged in a set arrangement has a total throat area 46 closer to the predetermined tolerance of the desired total throat area, then the first number of turbine vanes is selected. Alternatively, if the second number of turbine vanes arranged in a set arrangement has a total throat area 46 closer to the predetermined tolerance of the desired total throat area, then the second number of turbine vanes is selected.

In some embodiments, the second number of turbine vanes identified in identifying step 410 includes at least one turbine vane 24 from the first number of turbine vanes identified in identifying step 410. As such, a turbine vane 24 may be included in both the second number of turbine vanes and the first number of turbine vanes.

With reference to the selecting step 400 and the arranging step 500, in some embodiments, after a subgroup of turbine vanes is selected from a plurality of turbine vanes 24, the subgroup is arranged in various arrangements, and the arrangement having a tolerance within or closest to a desired total throat area tolerance is selected. As such, a selecting step 400B includes selecting a predetermined number of turbine vanes 24 from a plurality of turbine vanes 24 includes the identifying step 410, the inspecting step 412, and the inspecting step 414, as shown in FIG. 7.

Figure 7:
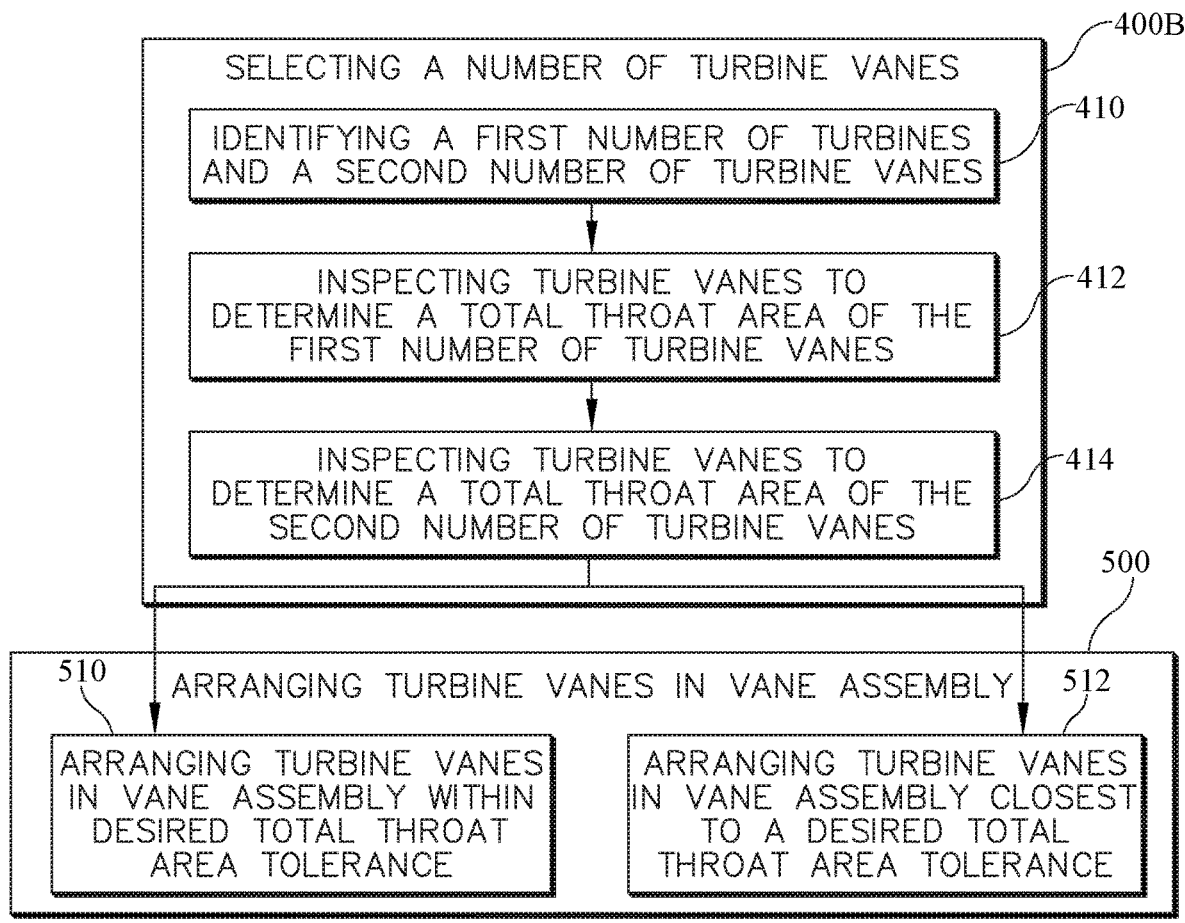
FIG. 7 is a simplified flowchart of a second method of selecting a number of turbine vanes and a method of arranging turbine vanes in a vane assembly.

The arranging step 500 includes the arranging step 510 and the arranging step 512, as shown in FIG. 7. The arranging step 510 includes arranging the predetermined number of turbine vanes in one of the first set arrangement and the second set arrangement based on which of the first set arrangement and the second set arrangement is within the predetermined tolerance of the desired throat area. Alternatively, the arranging step 512 may be performed. The arranging step 512 includes arranging the predetermined number of turbine vanes in one of the first set arrangement and the second set arrangement based on which of the first set arrangement and the second set arrangement is closest to the predetermined tolerance of the desired throat area.

Figure 8:
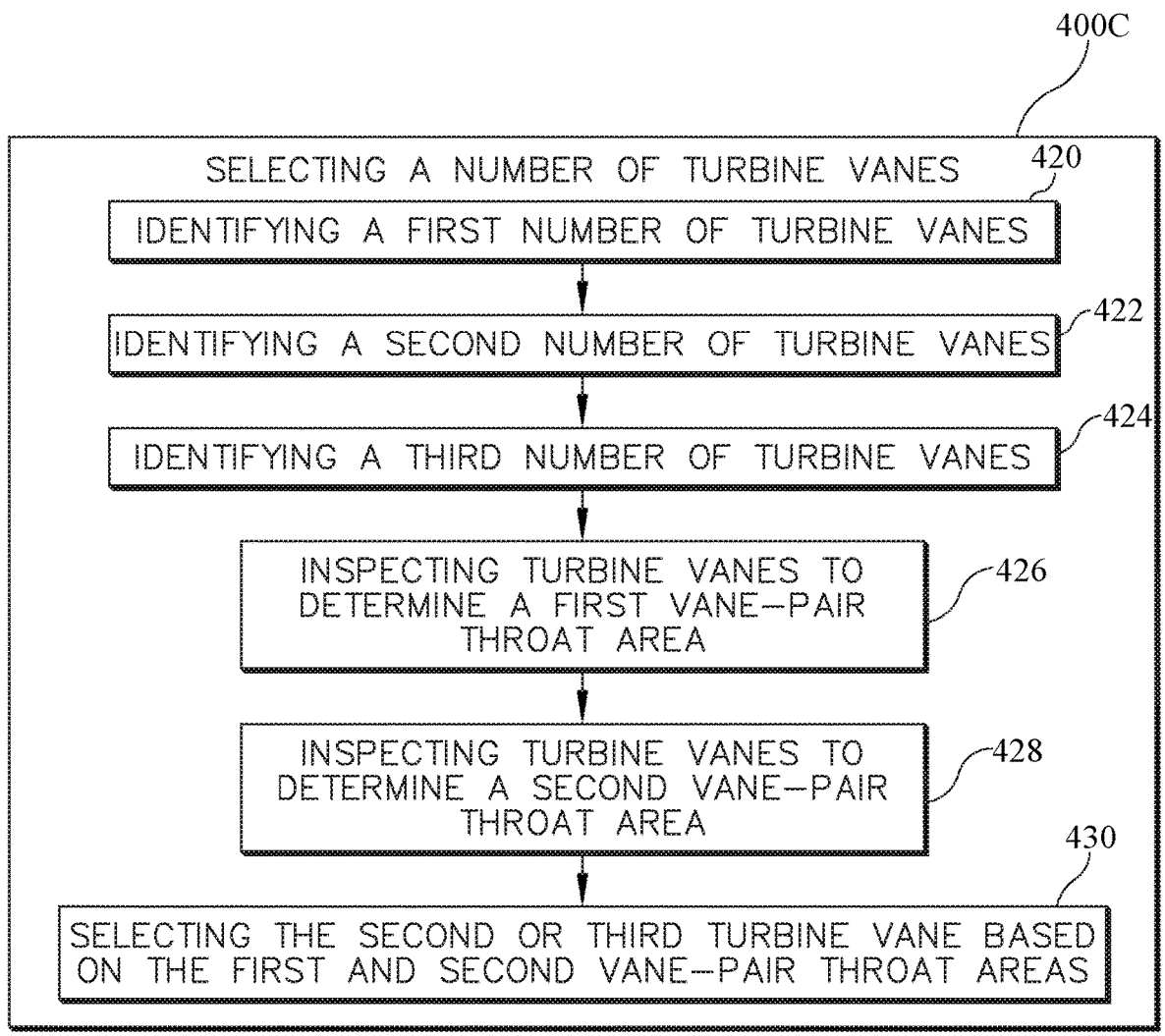
FIG. 8 is a simplified flowchart of a third method of selecting a number of turbine vanes.

With reference to the selecting step 400, in some embodiments, as a first turbine vane is selected and additional turbine vanes 24 of the plurality of turbine vanes are paired with the selected turbine vane to determine which turbine vane 24, when paired with the selected turbine vane, has a throat area 44 closest to a predetermined throat area. As such, a selecting step 400C may include an a first identifying step 420, a second identifying step 422, a third identifying step 424, a first inspecting step 426, a second inspecting step 428, and a selecting step 430, as shown in FIG. 8.

Identifying step 420 includes identifying a first turbine vane from the plurality or inventory of turbine vanes 24. Identifying step 422 includes identifying a second turbine vane from the plurality or inventory of turbine vanes 24. Identifying step 424 includes identifying a third turbine vane from the plurality or inventory of turbine vanes 24.

Inspecting step 426 includes inspecting turbine vanes to determine a first vane-pair throat area defined between the first turbine vane and the second turbine vane. The first vane-pair throat area is defined when the pressure side 40 of the second turbine vane is positioned adjacent to the suction side 42 of the first turbine vane. Inspecting step 428 includes inspecting turbine vanes to determine a second vane-pair throat area defined between the first turbine vane and the third turbine vane. The second vane-pair throat area is defined when the pressure side 40 of the third turbine vane is positioned adjacent to the suction side 42 of the first turbine vane.

Selecting step 430 includes selecting the first turbine vane and one of the second turbine vane and the third turbine vane to be included in the predetermined number of turbine vanes based on which of the first vane-pair throat area and the second vane-pair throat area is closest to a predetermined vane-pair throat area.

Figure 9:
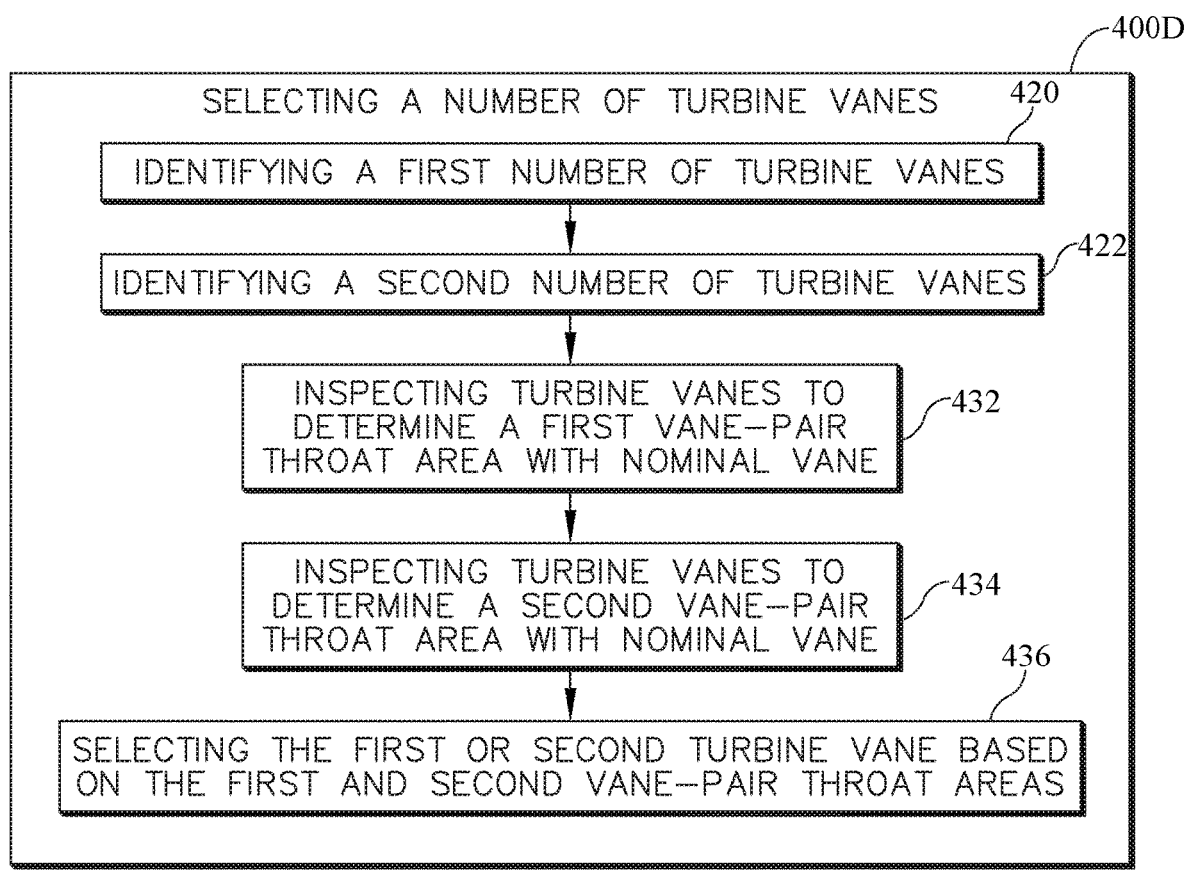
FIG. 9 is a simplified flowchart of a fourth method of selecting a number of turbine vanes.

With reference to the selecting step 400, in some embodiments, turbine vanes 24 of the plurality of turbine vanes are each paired with a nominal vane 72 to determine which turbine vane 24, when pair with the nominal vane 72, has a throat area 44 closest to a predetermined throat area. As such, a selecting step 400D may include the first identifying step 420, the second identifying step 422, a first inspecting step 432, a second inspecting step 434, and a selecting step 436, as shown in FIG. 9.

It should be appreciated that, a nominal vane is a hypothetical or computer-rendered vane having known size and shape. Conversely, a turbine vane is a manufactured vane adapted for use in a gas turbine engine that may have size and shape that vary from the nominal vane on which it is based.

Inspecting step 432 includes inspecting turbine vanes to determine a first vane-pair throat area defined between the first turbine vane and the nominal vane 72. The first vane-pair throat area is defined between the pressure side 40 of the first turbine vane and the suction side 42 of the nominal vane 72. Inspecting step 434 includes inspecting turbine vanes to determine a second vane-pair throat area defined between the second turbine vane and the nominal vane 72. The second vane-pair throat area is defined between the pressure side 40 of the second turbine vane and the suction side 42 of the nominal vane 72. Selecting step 436 includes selecting one of the first turbine vane and the second turbine vane to be included in the predetermined number of turbine vanes based on which of the first vane-pair throat area and the second vane-pair throat area is closest to a predetermined vane-pair throat area.

Figure 10:
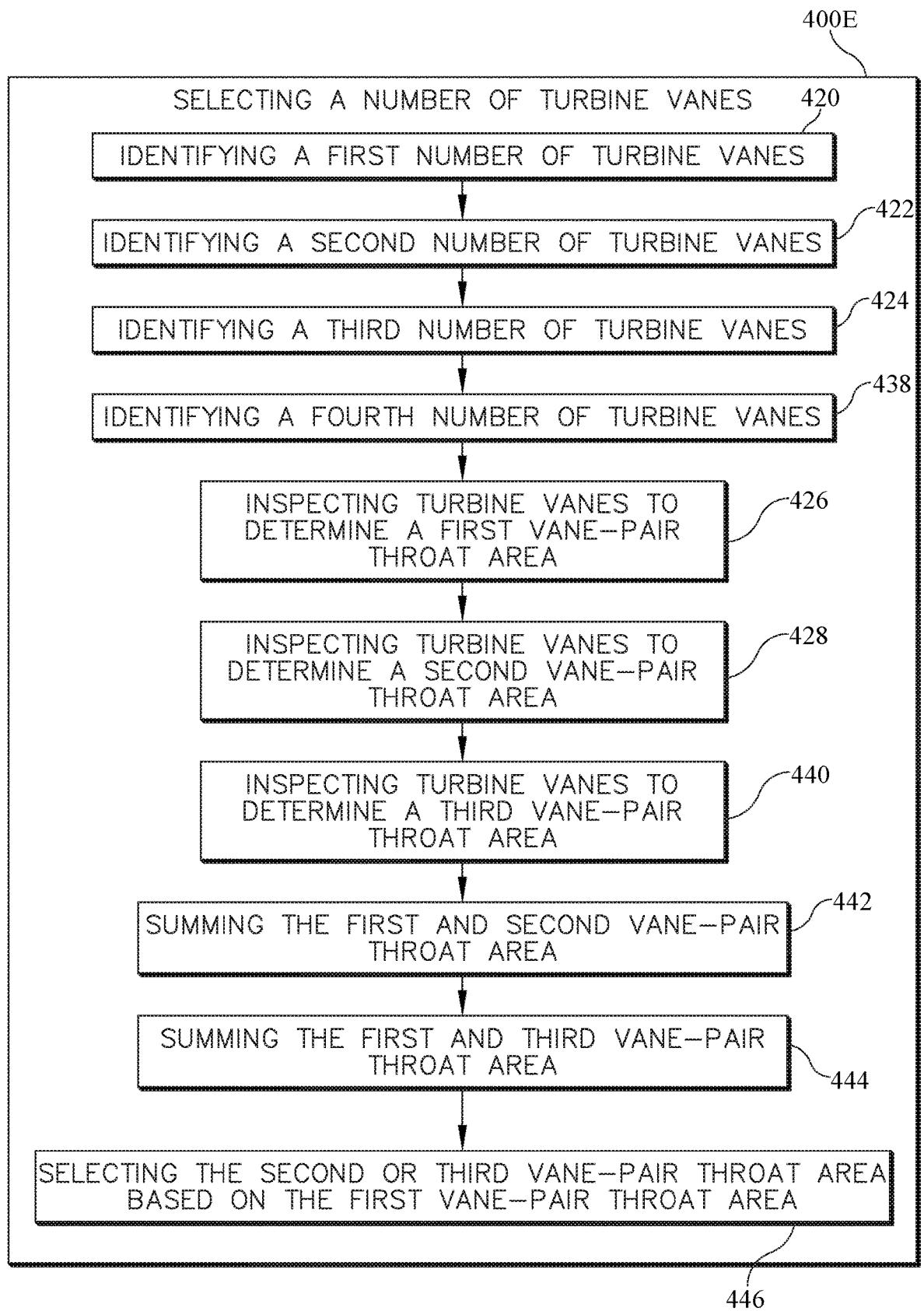
FIG. 10 is a simplified flowchart of a fifth method of selecting a number of turbine vanes.

With reference to the selecting step 400, in some embodiments, after a first and a second turbine vane have been selected and a first-vane pair throat area has been determined for the first and second selected turbine vanes, third and fourth turbine vanes are selected. Subsequently, the third and fourth turbine vanes are each paired with the second turbine vane to determine second and third vane-pair throat areas. Subsequently, the first and second vane-pair throat areas are summed, and the first and third vane pair throat areas are summed, and either the third or the fourth vane is selected based on which vane cooperates with the second vane to produce a summed vane-pair throat area closest to a desired vane pair throat area. As such, a selecting step 400E includes the first identifying step 420, the second identifying step 422, the third identifying step 424, a fourth identifying step 438, the first inspecting step 426, the second inspecting step 428, a third inspecting step 440, a first summing step 442, a second summing step 444, and a selecting step 446, as shown in FIG. 10.

Identifying step 438 includes identifying a fourth turbine vane from the plurality of turbine vanes 24. Inspecting step 440 includes inspecting turbine vanes to determine a third vane-pair throat area defined between the second turbine vane and the fourth turbine vane. The third vane-pair throat area is defined between the suction side 42 of the second turbine vane and the pressure side 40 of the fourth turbine vane.

Summing step 442 includes summing the first vane-pair throat area and the second vane-pair throat area to provide a first summed throat area. Summing step 444 includes summing the first vane-pair throat area and the third vane-pair throat area to provide a second summed throat area. Selecting step 446 includes selecting the first turbine vane, the second turbine vane, and one of the third turbine vane and the fourth turbine vane to be included in the predetermined number of turbine vanes based on which of the first summed throat area and the second summed throat area is closest to a predetermined summed throat area.

Figure 11:
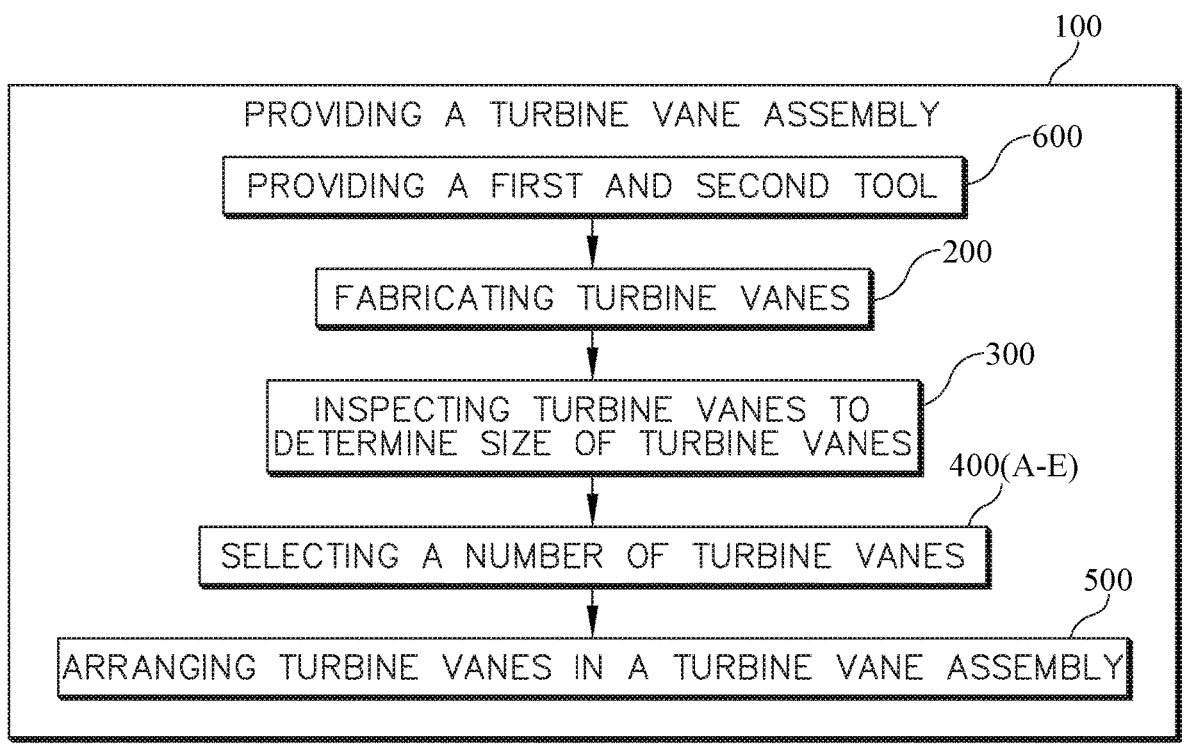
FIG. 11 is a simplified flowchart showing another method of providing a turbine vane assembly.

In some embodiments, the method 100 of providing a turbine vane assembly 22 may further include a providing step 600, as shown in FIG. 11. The providing step includes providing a first tool 48 sized and shaped to form turbine vanes 24 having a first nominal size and shape and a second tool 50 sized and shaped to form turbine vanes 24 having a second nominal size and shape. The second nominal size and shape is different than the first nominal size and shape. It should be appreciated that, the nominal size and shape of the turbine vanes 24 is the size and shape that the vanes would have if the vanes were the nominal vanes 72 that the turbine vanes 24 are based on, rather than turbine vanes 24.

Figure 12:
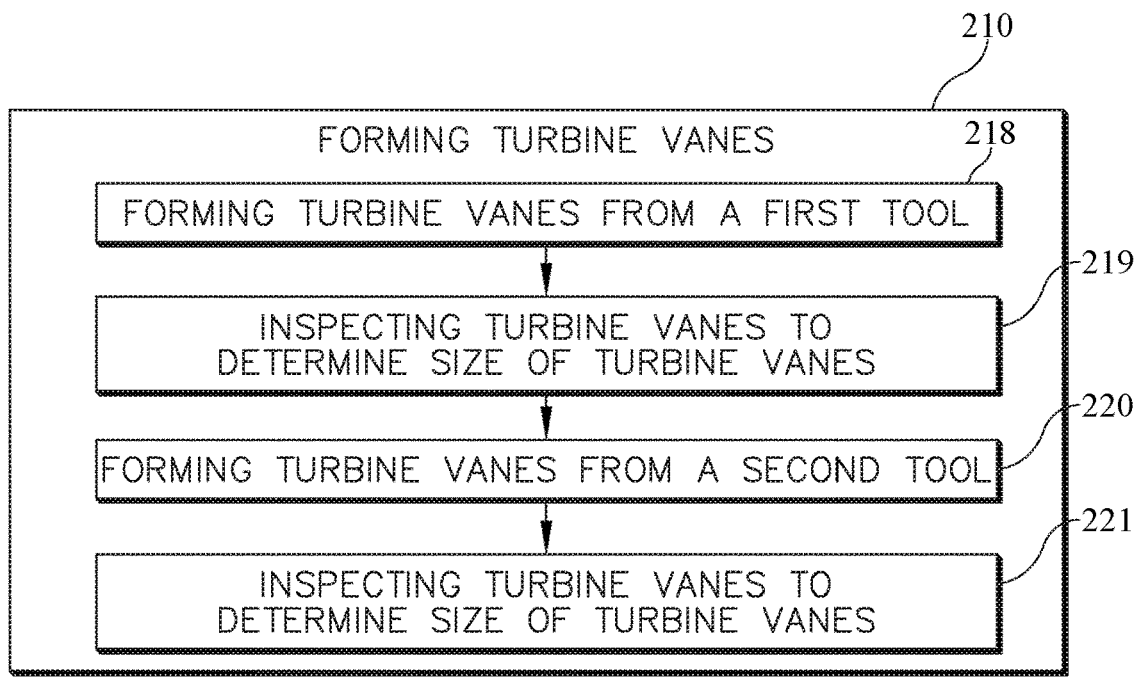
FIG. 12 is a simplified flowchart of a method of forming turbine vanes.

As illustratively shown in FIG. 12, the forming step 210 may include forming a first forming step 218, a first inspecting step 219, a second forming step 220, and a second inspecting step 221. The first forming step 218 includes forming a first plurality of non-machined and/or non-coated turbine vanes from the first tool 48. The first inspecting step 219 includes inspecting the first plurality of non-machined and/or non-coated turbine vanes to determine the size and shape of the turbine vanes. The second forming step 220 includes forming a second plurality of non-machined and/or non-coated turbine vanes from a second tool 50. The second inspecting step 221 includes inspecting the second plurality of non-machined and/or non-coated turbine vanes to determine the size and shape of the turbine vanes. The first and second plurality of non-machined and/or non-coated turbine vanes may be formed using ceramic matrix composite (CMC) material. The first and/or the second tool 48, 50 may be a mold, a die, or any other tool suitable to form a plurality of turbine vanes 24 having the desired size and shape.

In some embodiments, the first tool 48 has different size and shape from the second tool. As such, the first plurality of turbine vanes are configured to flow a first nominal amount of gas between adjacent turbine vanes. As such, the second plurality of turbine vanes are configured to flow a second nominal amount of gas between adjacent turbine vanes. The second nominal amount of gas is different than the first nominal amount of gas. It should be appreciated that, a nominal amount of gas is the amount of gas that would flow through the vanes if the vanes were nominal vanes 72 rather than turbine vanes 24.

Figure 13:
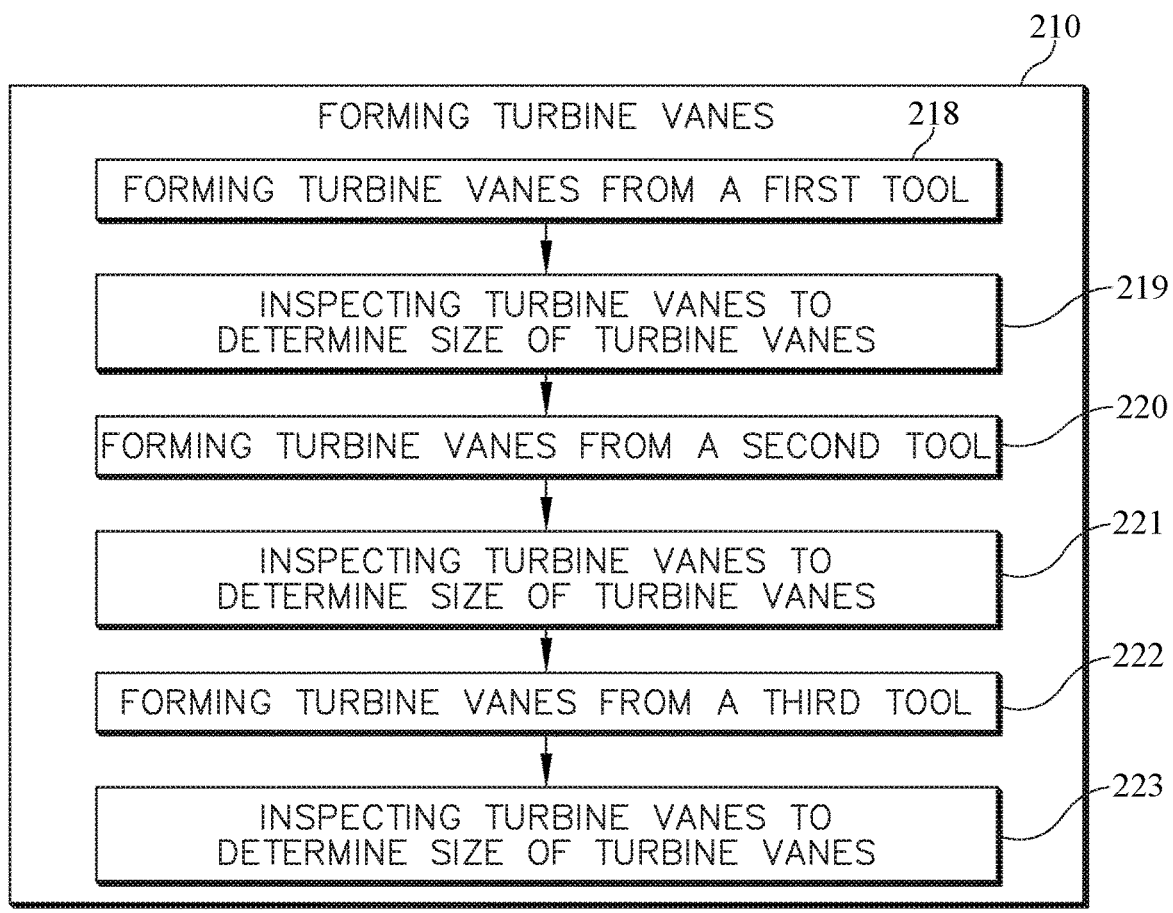
FIG. 13 is a simplified flowchart of another method of forming turbine vanes.

In some embodiments, the forming step 210 may further include forming a third forming step 222 and a third inspecting step 223, as shown in FIG. 13. The third forming step 222 includes forming a third plurality of non-machined and/or non-coated turbine vanes 24 from a third tool 52. The third inspecting step 223 includes inspecting the third plurality of non-machined and/or non-coated turbine vanes to determine the size and shape of the turbine vanes. The third plurality of non-machined and/or non-coated turbine vanes may be formed using ceramic matrix composite (CMC) material. The third tool 52 may be a mold, a die, or any other tool suitable to form a plurality of turbine vanes 24 having desired size and shape. In some embodiments, the third tool has different size and shape from the first tool 48 and the second tool 50. As such, the third plurality of turbine vanes formed from the third tool has different size and shape from the first and second plurality of turbine vanes formed from the first tool 48 and second tool 50.

In some embodiments, each turbine vane 24 included in the second plurality of turbine vanes has a nominal throat area that is greater than a nominal throat area of each turbine vane 24 included in the first plurality of turbine vanes and less than a nominal throat area of each turbine vane 24 included in the third plurality of turbine vanes. The nominal throat area is the throat area 44 defined between the trailing edge 38 of a turbine vane 24, or a nominal vane 72, and the suction side 42 of a nominal vane 72. Thus, the nominal throat area may be calculated for either a turbine vane 24 or a nominal vane 72. It should be appreciated that to calculate nominal throat area of a turbine vane 24 or a nominal vane 72, all relevant variables, other than size and shape of the vane, should be held constant. Such relevant variables may include orientation of the vane, radial positioning of the vane relative to the axis 20, circumferential positioning of the vanes relative to adjacent nominal vanes, coating of the vanes, and/or machining of the vanes.

It should be appreciated that any number of tools, each having different size and shape may be used to form any number of pluralities of turbine vanes 24 having different size and shape. The variance in size and shape is not random, arbitrary, or insignificant. The use of different tools to form different pluralities of turbine vanes 24 having different size and shape is significant because forming differently sized turbine vanes 24 intentionally introduces increased variation into the inventory of turbine vanes 24. An Increase in variation in the inventory of turbine vanes 24 may increase the likelihood that a turbine vane 24, that would improve performance of the gas turbine engine 10 by beneficially altering the total throat area 46 of the vane assembly 22, is available to be selected from the inventory of turbine vanes 24. It should be appreciated that there is an engine level fuel burn benefit associated with a turbine throat area tolerance within or near to a desired turbine throat area tolerance.

Figure 14:
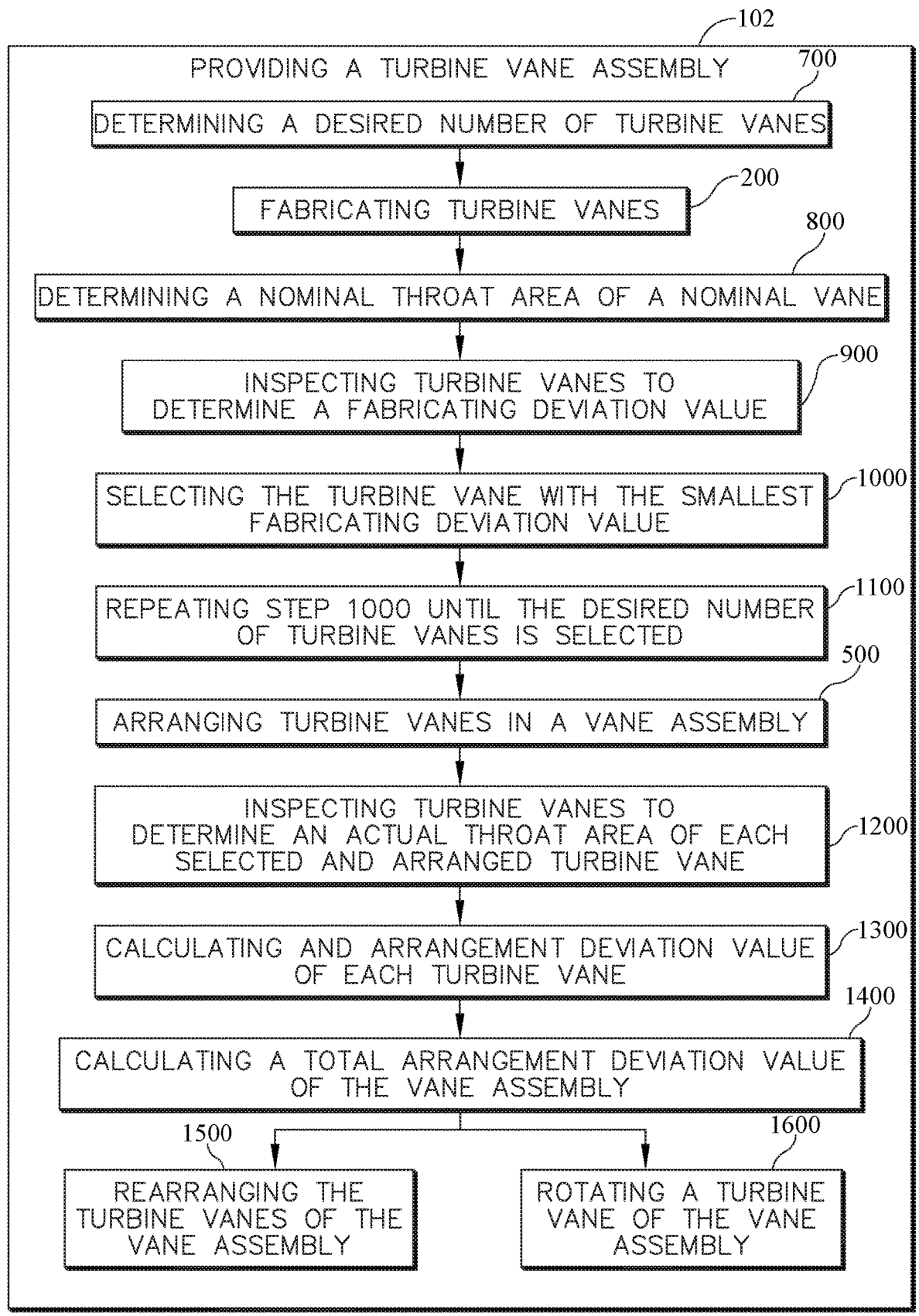
FIG. 14 is a simplified flowchart showing another method of providing a turbine vane assembly.

In some embodiments, a method 102 includes a first determining step 700, the fabricating step 200, a second determining step 800, an inspecting step 900, a selecting step 1000, a repeating step 1100, and the arranging step 500, as shown in FIG. 14. It should be appreciated that where reference numbers are common to the method 100 and the method 102, those reference numbers are intended to have the same meaning in each embodiment. As such, at least the description above regarding the fabricating step 200 and the arranging step 500 of method 100 is equally applicable to method 102.

The first determining step 700 of the method 102 includes determining a desired number of turbine vanes configured to be arranged circumferentially adjacent to one another about the axis 20 to form the turbine vane assembly 22 that extends around the axis 20. It should be appreciated that turbine vane assembly 22 may also be referred to as a ring 22, and the same meaning is conveyed in each case. The fabricating step 200 may further include fabricating an inventory of turbine vanes 24. The inventory of turbine vanes 24 has a greater number of turbine vanes 24 than the desired number of turbine vanes referred to in the determining step 700.

The second determining step 800 of the method 102 includes determining a nominal throat area of a nominal turbine vane. The inspecting step 900 of method 102 includes inspecting turbine vanes to determine a fabricating deviation value for each turbine vane 24 included in the inventory of turbine vanes 24. The fabricating deviation value is the difference between the throat area 44 of a turbine vane 24 included in the inventory of turbine vanes 24 and the nominal throat area of a nominal vane 72. In other words, the fabricating deviation value is the amount that a manufactured or fabricated turbine vane 24 varies size and shape from the nominal vane 72.

In some embodiments, the method 102 of providing a turbine vane assembly may include the step of performing a flow analysis, in which a stream of air or gas flow is passed through the throat area 44 of turbine vanes 24. The flow may be analyzed to determine whether the turbine vanes are adequately sized and shaped, such that the turbine vanes 24 may be included in the turbine vane assembly 22.

The selecting step 1000 of method 102 includes selecting one turbine vane 24 from the inventory of turbine vanes 24, the selected one turbine vane 24 having a fabricating deviation value smaller than each unselected turbine vane 24 included in the inventory of turbine vanes 24. Thus, the turbine vane 24 having the least fabricating deviation value is selected in the selecting step 1000. The repeating step 1100 includes repeating the selecting step 1000 until the desired number of turbine vanes has been selected from the inventory of turbine vanes 24. The arranging step 500 includes arranging each selected turbine vane 24 circumferentially adjacent to another selected turbine vane 24 to form the vane assembly 22 that extends around the axis 20.

In some embodiments, the method 102 may include a second inspecting step 1200 and a first calculating step 1300, as shown in FIG. 14. The second inspecting step 1200 includes inspecting the turbine vanes to determine an actual throat area of each selected and arranged turbine vane. An actual throat area is the throat area 44 defined between the trailing edge 38 of a turbine vane 24 and the suction side 42 of an adjacent turbine vane 24 when the turbine vanes 24 are arranged circumferentially adjacent to one another to form the vane assembly 22 that extends around the axis 20. The first calculating step 1300 includes calculating an arrangement deviation value for each selected and arranged turbine vane. The arrangement deviation value is the difference between the actual throat area of a selected and arranged turbine vane 24 and the nominal throat area of a nominal vane 72 on which the selected and arranged turbine vane 24 is based.

In some embodiments, the method of claim 102 may include a second calculating step 1400 and a rearranging step 1500, as shown in FIG. 14. The second calculating step 1400 includes calculating a total arrangement deviation value of the vane assembly 22. The total arrangement deviation is the sum of the arrangement deviation value of each selected and arranged turbine vane 24. The rearranging step 1500 includes rearranging at least one selected and arranged turbine vane 24 relative to another selected and arrange turbine vane 24 to reduce the total arrangement deviation value of the vane assembly 22. Rearranging may include swapping the position in the vane assembly 22 of one turbine vane 24 for the position in the vane assembly 22 of another turbine vane 24. Rearranging may include changing a position of any one turbine vane 24 in the vane assembly 22 relative to any other turbine vane 24 in the vane assembly 22.

In some embodiments, the method of claim 102 may include the second calculating step 1400 and a rotating step 1600, as shown in FIG. 14. The rotating step 1600 may be performed in addition to or instead of the rearranging step 1500. The rotating step 1600 includes rotating at least a portion of one selected and arranged turbine vane 24 relative to another selected and arrange turbine vane 24 to reduce the total arrangement deviation value of the vane assembly 22. Rotating may include rotating a selected and arranged turbine vane 24 axially, circumferentially, or radially about any point of the selected and arranged turbine vane relative to an adjacent selected and arranged turbine vane 24.

In some embodiments the methods 100, 102 may be performed using a controller illustratively including a processor and memory coupled to the processor. The processor is of any suitable type and is configured to execute instructions stored in the memory. The memory is illustratively of any suitable type and contains instructions associated with any or all of the steps of methods 100, 102, as described above.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of providing a turbine vane assembly, the method comprising:
forming a plurality of non-machined turbine vanes, the forming step including fabricating a plurality of turbine vanes comprising ceramic matrix composite material,
determining a size of each of the plurality of non-machined turbine vanes,
machining the plurality of non-machined turbine vanes to remove an amount of material based on the size of each of the plurality of non-machined turbine vanes from a trailing edge of each of the plurality of turbine vanes,
determining a size of each of the plurality of machined turbine vanes,
selecting a predetermined number of machined turbine vanes from the plurality of machined turbine vanes based on the size of each of the plurality of machined turbine vanes,
arranging the predetermined number of machined turbine vanes around an axis to provide a turbine vane assembly having a throat area within a predetermined tolerance of a desired throat area,
wherein the selecting step includes identifying a first number of machined turbine vanes from the plurality of machined turbine vanes and a second number of machined turbine vanes from the plurality of machined turbine vanes, determining a first throat area of a first turbine vane assembly comprised of the first number of machined turbine vanes in a set arrangement, determining a second throat area of a second turbine vane assembly comprised of the second number of machined turbine vanes in a set arrangement, comparing the first throat area to the second throat area, selecting one of the first number of machined turbine vanes and the second number of machined turbine vanes to be the predetermined number of machined turbine vanes based on the comparison between the first throat area and the second throat area, and
wherein the second number of machined turbine vanes includes at least one machined turbine vane included in the first number of machined turbine vanes.

2. The method of claim 1, wherein the fabricating includes forming a plurality of non-coated turbine vanes, determining a size of each of the plurality of non-coated turbine vanes, and coating each of the plurality of non-coated turbine vanes with a coating having a thickness based on the size of each of the plurality of non-coated turbine vanes.

* * * * *